(12) United States Patent
Wang et al.

(10) Patent No.: US 10,643,090 B2
(45) Date of Patent: May 5, 2020

(54) METHOD AND DEVICE FOR GUIDING USERS TO RESTORE RUBIK'S CUBE

(71) Applicant: Shanghai Putao Technology Co., Ltd., Shanghai (CN)

(72) Inventors: Letian Wang, Shanghai (CN); Peng Du, Shanghai (CN); Qingyun Li, Shanghai (CN); Huan Chen, Shanghai (CN); Mingying Gu, Shanghai (CN)

(73) Assignee: SHANGHAI PUTAO TECHNOLOGY CO., LTD., Shanghai (CN)

( * ) Notice: Subject to any disclaimer, the term of this patent is extended or adjusted under 35 U.S.C. 154(b) by 220 days.

(21) Appl. No.: 15/847,218

(22) Filed: Dec. 19, 2017

(65) Prior Publication Data

US 2018/0322356 A1    Nov. 8, 2018

(30) Foreign Application Priority Data

May 8, 2017    (CN) .......................... 2017 1 0315967

(51) Int. Cl.
| | |
|---|---|
| G06K 9/00 | (2006.01) |
| G06T 7/13 | (2017.01) |
| A63F 9/08 | (2006.01) |
| G06K 9/32 | (2006.01) |
| G06T 7/73 | (2017.01) |
| G06T 7/90 | (2017.01) |
| G06K 9/62 | (2006.01) |
| A63F 9/24 | (2006.01) |

(52) U.S. Cl.
CPC .......... *G06K 9/3208* (2013.01); *A63F 9/0842* (2013.01); *G06K 9/00* (2013.01); *G06K 9/6202* (2013.01); *G06T 7/13* (2017.01); *G06T 7/74* (2017.01); *G06T 7/90* (2017.01); *A63F 2009/2425* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 2015/0064661 A1 | 3/2015 | Lu et al. | |
| 2017/0102857 A1 | 4/2017 | Badiger et al. | |
| 2019/0114944 A1* | 4/2019 | Garrett | ................ A63F 13/5375 |

FOREIGN PATENT DOCUMENTS

| | | |
|---|---|---|
| CN | 102699917 A1 | 10/2012 |
| CN | 105082141 A1 | 11/2015 |

(Continued)

OTHER PUBLICATIONS

Hsu et al., "Intelligent Rubik's Cube Solver", 2013, 2013 FPGA Workshop and Design Contest (Year: 2013).*

(Continued)

*Primary Examiner* — Matthew C Bella
*Assistant Examiner* — Brian D Shin
(74) *Attorney, Agent, or Firm* — Finnegan, Henderson, Farabow, Garrett & Dunner, LLP (57) ABSTRACT

The present disclosure relates to the technical field of computer visual detection processing, and provides a method for guiding users to restore Rubik's cubes. The method comprises step 1, acquiring arrangement information of colored blocks of the Rubik's cube; step 2, displaying restoration process of the Rubik's cube.

14 Claims, 7 Drawing Sheets

(56) References Cited

FOREIGN PATENT DOCUMENTS

| CN | 105513086 A1 | 4/2016 |
|---|---|---|
| CN | 105719318 A1 | 6/2016 |

OTHER PUBLICATIONS

"Rubiks Cube Tracker using OpenCV", 2017, http://programmablebrick.blogspot.com/2017/02/rubiks-cube-tracker-using-opencv.html (Year: 2017).*

First Office Action in the Chinese counterpart application No. 201710315967.2 issued by National Intellectual Property Administration (CNIPA) dated Nov. 5, 2019.

First Search Report in the Chinese counterpart application No. 201710315967.2 issued by National Intellectual Property Administration (CNIPA) dated Oct. 22, 2019.

\* cited by examiner

METHOD AND DEVICE FOR GUIDING USERS TO RESTORE RUBIK'S CUBE

TECHNICAL FIELD

The present disclosure relates to the technical field of computer image recognition, in particular to a method and device for restoring a Rubik's cube.

BACKGROUND

Rubik's cubes are toys very popular among children. Playing a Rubik's cube is a maximal exercise for hands. The Rubik's cube is usually a square consisting of a plurality of blocks. The playing method is to scramble the Rubik's cube and then restore the scrambled Rubik's cube as fast as possible.

Two existing practical methods are usually used for restoring the Rubik's cube. By such two methods, users know how to restore the Rubik's cube.

One is the instructions of the Rubik's cube. The method for restoring the Rubik's cube is described using drawings and characters in a paper form or in an electronic form.

The other one is video courses. The restoring method of the Rubik's cube is explained and practiced according to the video courses, and the restoring operations are recorded in videos.

Such two methods both have the following defects.

1. The method of extracting and understanding key information from instructions or videos and then restoring the Rubik's cube is very difficult.

2. It fails to provide specific restoring method according to the colors and arrangement information of a current real Rubik's cube of a user.

In other words, the conventional methods for restoring the Rubik's cube can be applied to general conditions instead of specific cases. By using such two methods, users need to understand the instructions or videos, and then find out the specific operation method according to the current state of the Rubik's cube by themselves.

Therefore, a method and device for gradually guiding users to complete restoring of the Rubik's cube according to the specific conditions of the Rubik's cube in the hands of the users is in an urgent need in the technical field of Rubik's cube toys.

BRIEF SUMMARY OF THE DISCLOSURE

According to one innovative aspect of the subject matter in this disclosure, a method for guiding users to restore Rubik's cubes comprises the following steps: Step 1: acquiring the arrangement information of the colored blocks of a Rubik's cube; Step 2: displaying a method for restoring the Rubik's cube according to the arrangement information of the colored blocks of the Rubik's cube, wherein, Step 1 comprises: Step 11, setting a scanning region of interest (ROI) in a software interface; Step 12, acquiring and adjusting the position of the Rubik's cube such that the Rubik's cube is located at the right position; Step 13, detecting the position of the Rubik's cube in an image; and Step 14, extracting the colors of the Rubik's cube.

A further innovative aspect of the subject matter is wherein Step 2 comprises the following steps: Step 21, acquiring a restoring solution of the Rubik's cube; and Step 22, displaying the steps of restoring the Rubik's cube.

A further innovative aspect of the subject matter is, wherein Step 13 comprises the following steps: Step 131, graying the ROI; Step 132, extracting the colored block outlines using an edge detection algorithm; Step 133, matching shapes; and Step 134, counting circle centers.

A further innovative aspect of the subject matter is wherein Step 14 comprises the following steps: Step 141, acquiring data from an acquisition device; Step 142, extracting color information of the Rubik's cube; Step 143, performing recognition six times in a certain fixed sequence; and Step 144, determining if a total of 54 colored blocks exist, 9 colored blocks in each color; if not, executing Step 145 to prompt users to perform recognition again with proper lighting; if yes, executing Step 146 to acquire the color arrangement information of 54 colored blocks.

A further innovative aspect of the subject matter is wherein Step 21 comprises the following steps: Step 211, inputting the color arrangement information of the 54 colored blocks into a Two Phase algorithm; and Step 212, determining if the Two Phase algorithm outputs solutions, and if the number of the solutions is smaller than 8; if not, executing Step 213 to prompt users to scramble the Rubik's cube and performing recognition again; if yes, executing Step 214 to operate each of the restored virtual Rubik's cubes by the reverse sequence of the corresponding one of the solutions, wherein the operation result may be the current state of the Rubik's cube of the user or includes a plurality of Rubik's cube states of the Rubik's cube currently in the hands of the user; if the operation result includes a plurality of Rubik's cube states of the Rubik's cube currently in the hands of the user, executing Step 215 to prompt the user to select a virtual Rubik's cube which is in a state identical with the current state of the Rubik's cube in their hands; if the operation result is the current state of the Rubik's cube of the user, executing Step 216, wherein the selected virtual Rubik's cube shows the state of the Rubik's cube in the hands of the user.

According to another innovative aspect of the subject matter in this disclosure, the device comprises: an acquisition equipment, which acquires the arrangement information of color blocks of a Rubik's cube; a restore equipment, which connects with the acquisition equipment and acquires a restoring solution and displays steps for restoring the Rubik's cube according to the arrangement information of the colored blocks of the Rubik's cube.

Numerous features and advantages of the technology presented herein are described throughout this disclosure. It should be understood, however, that the features and advantages described herein are not all-inclusive and many additional features and advantages are contemplated and fall within the scope of the present disclosure. Moreover, it should be understood that the language used in the present disclosure has been principally selected for readability and instructional purposes, and not to limit the scope of the subject matter disclosed herein.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION OF THE DISCLOSURE

For better understanding of the implementation methods, inventive features, objectives and effects of the technical solution of the present disclosure, the technical solutions in embodiments of the present disclosure are described clearly and completely in conjunction with the attached drawings in the embodiments of the present disclosure. Obviously, the described embodiments are only a part of embodiments of the present disclosure, not all embodiments of the present disclosure. Based on the embodiments in the present disclosure, a person skilled in this art can obtain other embodiments without creative labor, which all shall fall within the protective scope of the present disclosure.

The present disclosure provides a method for guiding users to restore Rubik's cubes, comprising the following steps:

Step 1: acquiring the arrangement information of colored blocks of a Rubik's cube;

Step 2: displaying the steps for restoring the Rubik's cube according to the arrangement information of the colored blocks of the Rubik's cube.

Figure 1:
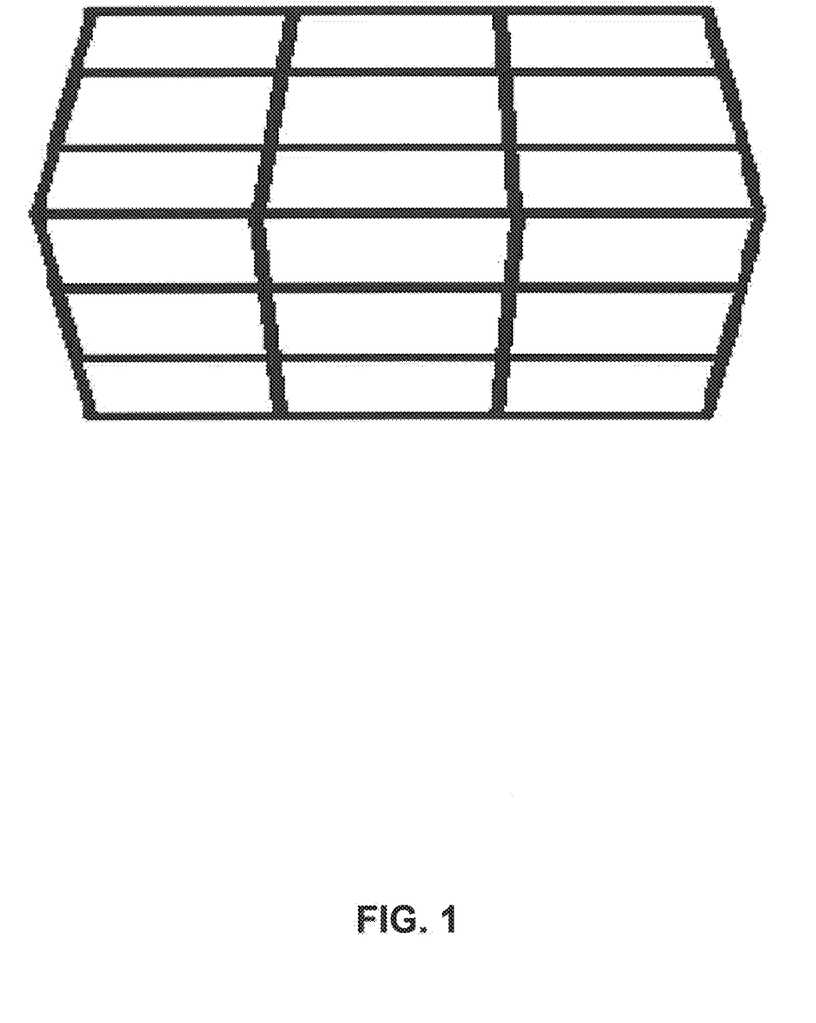
FIG. 1 is a schematic view of an exemplary grids.

Step 1 of acquiring the arrangement information of the colored blocks of a Rubik's cube comprises the following steps 11, 12, and 13:

In step 11, a scanning region of interest (ROI) is set in a software interface. As shown in FIG. 1, the region surrounded by a grid frame in the software interface is the ROI. Only the ROI is scanned. Contents outside the ROI are neglected. 18 grids are shown in the figure. Two surfaces of the Rubik's cube can be scanned at one time. Scanning one surface or more surfaces is allowed. Such scanning is only different in scanning modes, but the recognition technology of the scanning is the same in nature.

In step 12, the position of the Rubik's cube is acquired and adjusted, such that the Rubik's cube is located at the right position.

Figure 2:
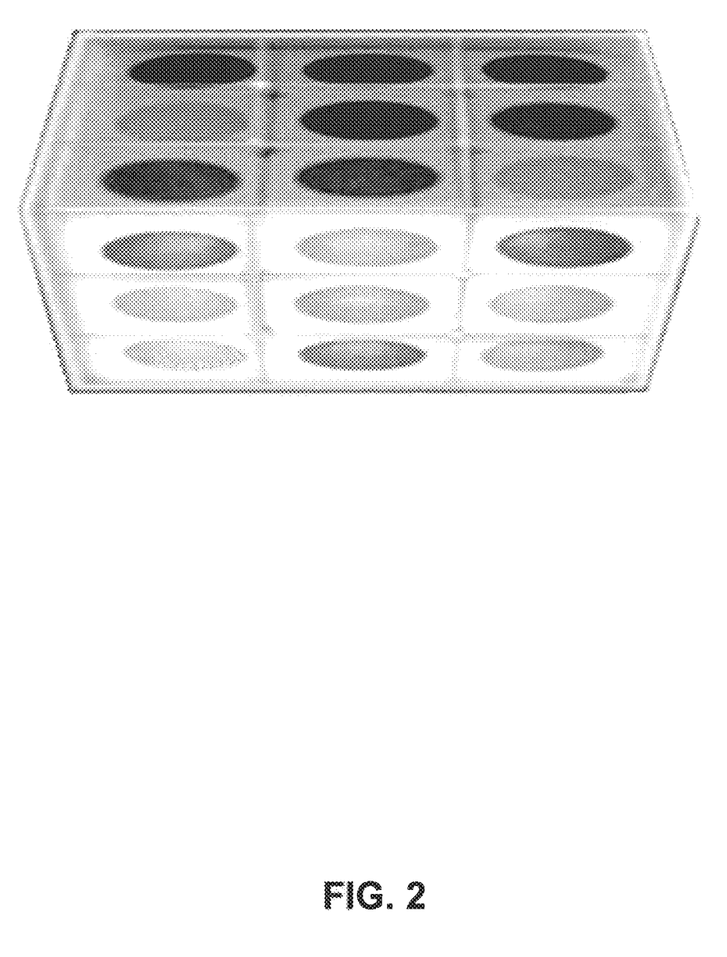
FIG. 2 is a schematic view of an exemplary horizontal placement of a Rubik's cube in an area-of-interest.

As shown in FIG. 2, in the image acquired by the acquisition device, the Rubik's cube should be horizontally placed in the ROI, and a total of 18 oval colored blocks on the top and front surfaces of the Rubik's cube should be basically superimposed with the 18 grids, for example. In this way, the placement is deemed to be correct. If it is detected that the number of the ovals in the 18 grids is not enough, or the oval position is far away from the region of the standard grid, it is deemed that the Rubik's cube is not placed correctly. The user needs to adjust the position of the Rubik's cube until the above conditions are satisfied.

In step 13, the position of the Rubik's cube in an image is detected.

Figure 3:
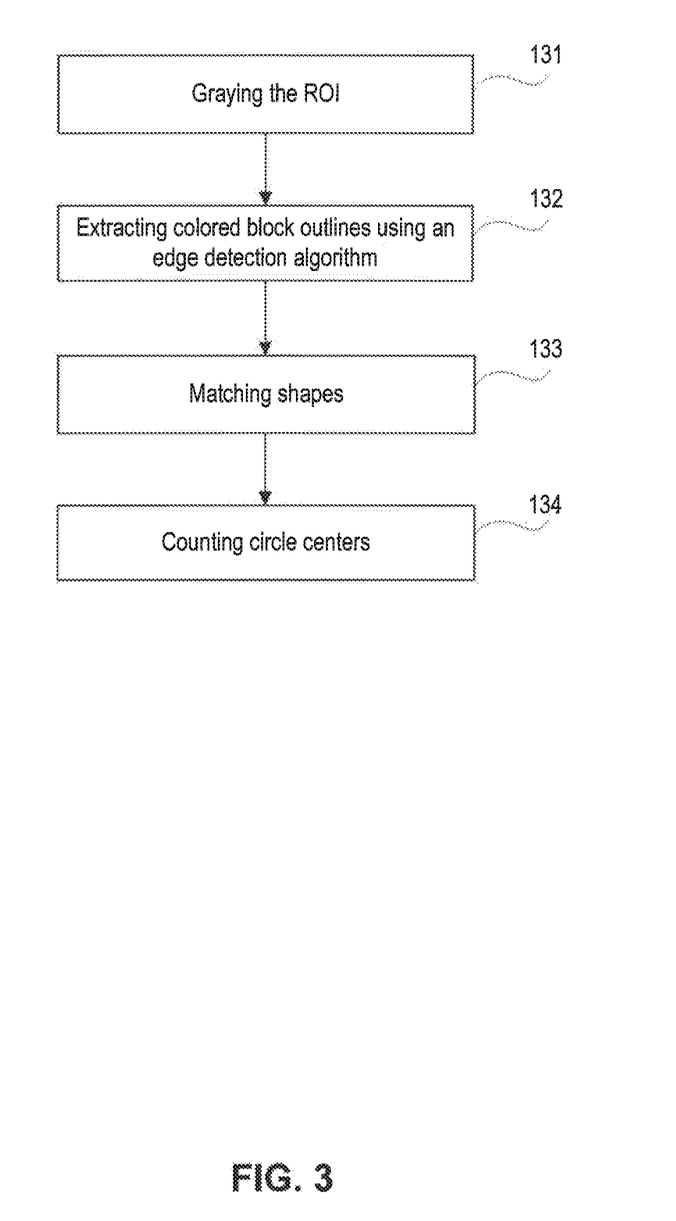
FIG. 3 is a flowchart of the position detection of the Rubik's cube.

The flowchart of the position detection of the Rubik's cube can be seen in FIG. 3, comprising the following steps 131-134:

In step 131, the ROI can be grayed.

In step 132, colored block outlines using an edge detection algorithm can be extracted.

In step 133, shapes can be matched.

In step 134, circle centers can be counted.

Step 131 is described in detail below.

First, the image is defined as the pixel value of a current coordinate position represented by R, G and B. For example, the acquired image of the Rubik's cube is a color picture, and the three primary colors (i.e., red, green, and blue) can be used to represent the color value of a pixel in the image, namely, wherein R, G and B represent the numbers of the red, green and blue channels at a certain coordinate position.

Second, the ROI of the color image is grayed. The following formula can be used to convert the ROI in the color image into a gray image:

$$Gray(x,y)=0.2989 \lambda R_{xy}+0.5870 \times G_{xy}+0.1140 \times B_{xy};$$

wherein, Gray(x,y) represents the gray image.

The Step 132 is described in detail below.

Edges of the image are usually portions with dramatic changes in gray value. The change degree of the gray value is usually quantitatively expressed by using the gradient change between adjacent pixels. The gradient is a two-dimensional equivalent expression of a first-order two-dimensional derivative, and the specific calculation process is as follows.

First, the difference between adjacent pixels can be calculated by using the following specific equations:

$$Gx=f[i,j+1]-f[i,j]$$

$$Gy=f[i,j]-f[i+1,j]$$

wherein, Gx represents the difference of adjacent pixels in the direction x; Gy represents the difference of the adjacent pixels in direction y; f[i, j+1] represents the pixel value in column j+1 of row i in the image; f[i, j] represents the pixel value in column j of row i in the image; f[i+1, j] represents the pixel value of the column j in the row i+1 in the image.

Second, the gradient between adjacent pixels can be calculated by using the equation:

$$G(x, y) = \begin{bmatrix} G_x \\ G_y \end{bmatrix} = \begin{bmatrix} \frac{\partial f}{\partial x} \\ \frac{\partial f}{\partial y} \end{bmatrix};$$

wherein, G(x,y) represents the gradient value at point (x,y) in the image;

$$\frac{\partial f}{\partial x}$$

represents the deviation of the pixel value in the direction x;

$$\frac{\partial f}{\partial y}$$

represents the deviation of the pixel value in the direction y.

Third, the gradient amplitudes of edge points can be calculated, wherein the set of the gradient amplitudes of all edge points is the edge outline extracted.

Figure 4:
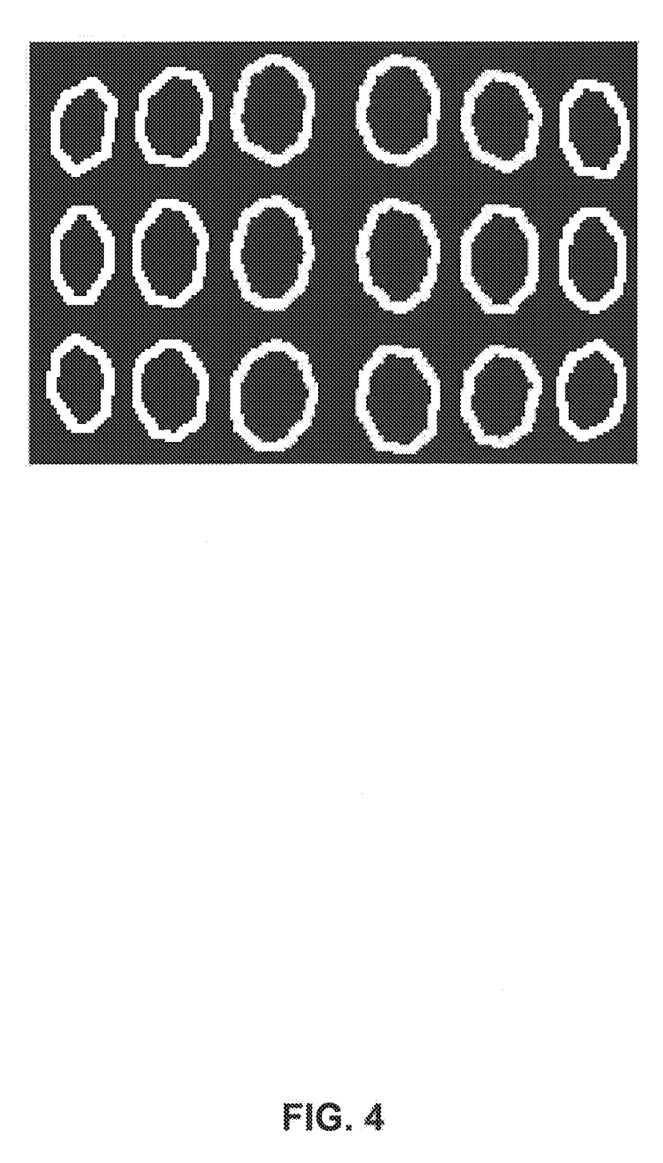
FIG. 4 is a schematic view of an exemplary binary outline of a colored block edge.

For a Rubik's cube target to be detected, after conversion into the gray image, the six colors (e.g., red, yellow, blue, cyan, green and purple) blocks are relatively greatly different from the ground color of the white Rubik's cube, so the outlines of the six colored blocks are deemed as the edges of the current image. The colored block outlines are extracted by using an edge detection method. The edge detection algorithm includes, but is not limited to: Sobel operator, Roberts operator, Prewitt operator, and Canny operator. The obtained binary outlines of the edges of the colored blocks can be seen in FIG. 4.

The Step 133 is described in detail. Shape matching is as follows.

For the colored block outlines obtained in Step 132, the binary outlines are screened by using a shape matching method as described in the text concerning shapes, and the distances between the outlines of shapes and an oval shape (the colored blocks of the Rubik's cube are oval) are calculated. The distance value is calculated by using the following formula:

$$C_s = \frac{1}{2} \sum_{k=1}^{K} \frac{[g(k) - h(k)]^2}{g(k) + h(k)};$$

$$\text{Outline shape of colored block} = \begin{cases} \text{Oval} & C_s < M \\ \text{Non-oval} & C_s \geq M \end{cases};$$

wherein, Cs represents the distance value between the outline of a standard oval shape and the shape of a colored block of the Rubik's cube; g(k) and h(k) respectively represent an outline point set of the standard oval shape and a shape to be detected; M represents a threshold distance value; k represents the $k^{th}$ element point in the outline point set; K represents the number of the elements in the outline point set; when Cs is smaller than M, it is determined that the outline shape of the current colored block is oval; and when Cs is greater than or equal to M, it is determined that the outline shape of the current colored block is not oval.

Step 134 of counting the circle centers is described in detail below. Whether or not the Rubik's cube is correctly placed is determined by calculating the number of the oval outlines.

In the ROI, if 18 ovals are detected, it is deemed that the Rubik's cube is correctly placed in the scanning ROI of the game. Or, the user will be prompted to adjust the position of the Rubik's cube for re-testing.

Acquiring the arrangement information of the colored blocks of the Rubik's cube by scanning two surfaces at the same time is illustrated above. Those skilled in the art should understand that the image information of all surfaces of the Rubik's cube can be acquired by means of scanning or photographing the six surfaces of the Rubik's cube one by one using the acquisition device such as the camera; and, three surfaces can be scanned or photographed at the same time.

The Rubik's cube is rotated to acquire the image information of the remaining surface to obtain the arrangement information of the colored blocks on the six surfaces of the Rubik's cube.

According to the present disclosure, the image information of the remaining surface can also be deduced by scanning the image information of five surfaces.

According to the present disclosure, the image information of the remaining surfaces can also be deduced by scanning the image information of four surfaces.

The present disclosure has no limit in this aspect. The method of the present disclosure or similar methods used should fall within the protective scope of the present disclosure.

In step 14, colors of the Rubik's cube is extracted.

In the present disclosure, the colors can be identified by using an HSV (Hue, Saturation, Value) technology. The image acquired by the camera is defined as Ixy. Ixy=f(x,y), wherein (x,y) represents the position coordinate of a pixel in the image; f(x,y) represents the pixel value of the image at the point x,y. An original image is converted into an HSV color image. The number of the H-color channels of each one of the colors in the HSV color space is relatively stable, and the numerical interval between different colors is relatively large, so a pixel average set is compared with a threshold value interval of the six colors on the H channel to determine the color of each one of the colored blocks in the scanning ROI.

Figure 5:
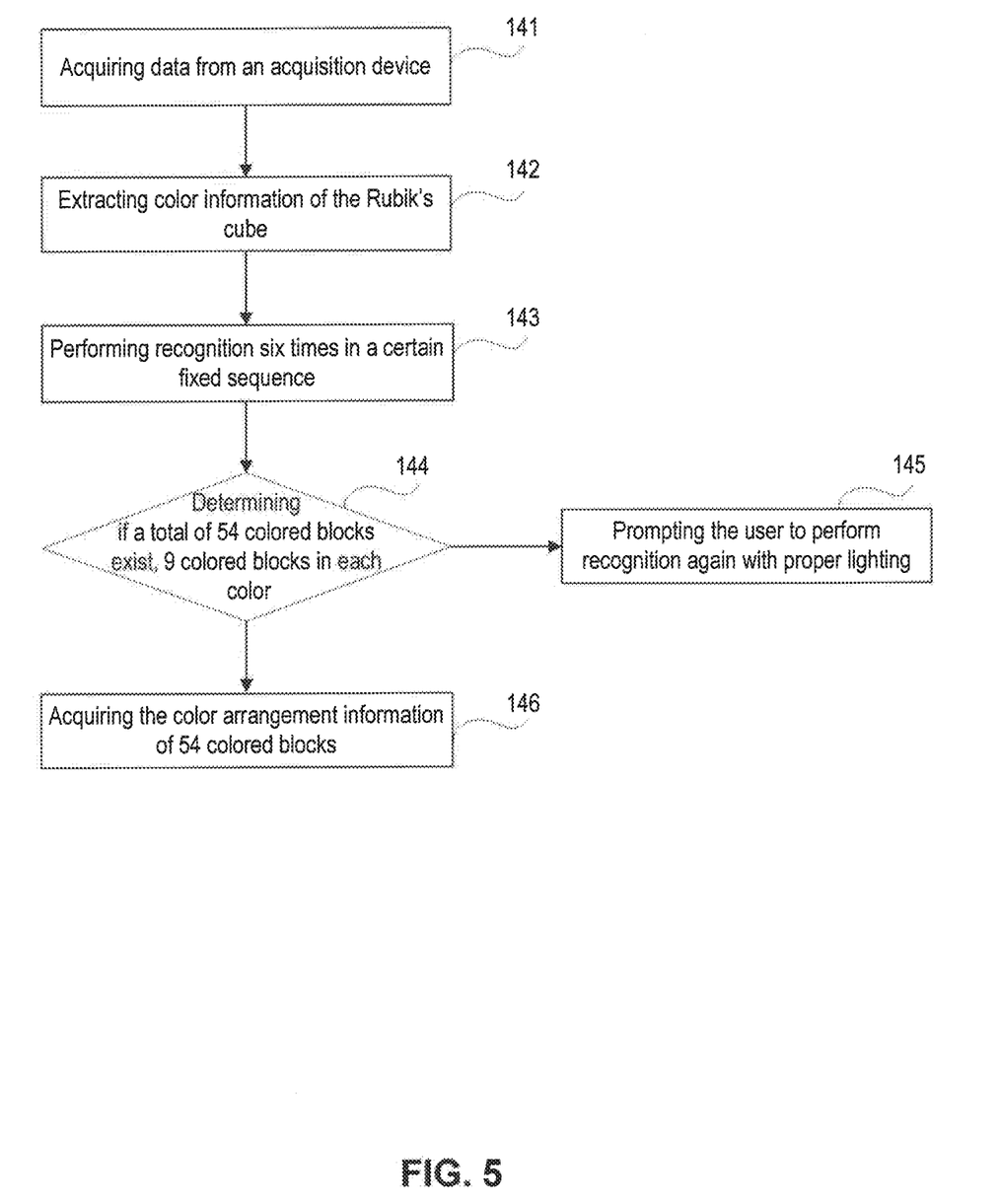
FIG. 5 is a flowchart of an exemplary method for extracting colors of the Rubik's cube.

FIG. 5 shows a flowchart of an exemplary method for extracting colors of a Rubik's cube. The method for extracting colors of a Rubik's cube can comprise steps 141-144.

Step 141, acquiring data from an acquisition device;

Step 142, extracting color information of the Rubik's cube;

Step 143, performing recognition six times according to a certain fixed sequence (for example, R\F\D\L\B\U), wherein R(right), L(left), B(backward), F(forward), D(down) and U(up) respectively correspond to a total of six surfaces, namely the right, left, rear, front, top and bottom surfaces, of the Rubik's cube;

Step 144, determining if a total of 54 colored blocks exist, 9 colored blocks in each color;

if not, executing Step 145 to prompt users to perform recognition again with proper lighting;

if yes, executing Step 146 to acquire the color arrangement information of 54 colored blocks.

Step 2 is described in detail below. The method for displaying the method for restoring the Rubik's cube according to the arrangement information of the colored blocks of the Rubik's cube comprises the following steps.

Figure 6:
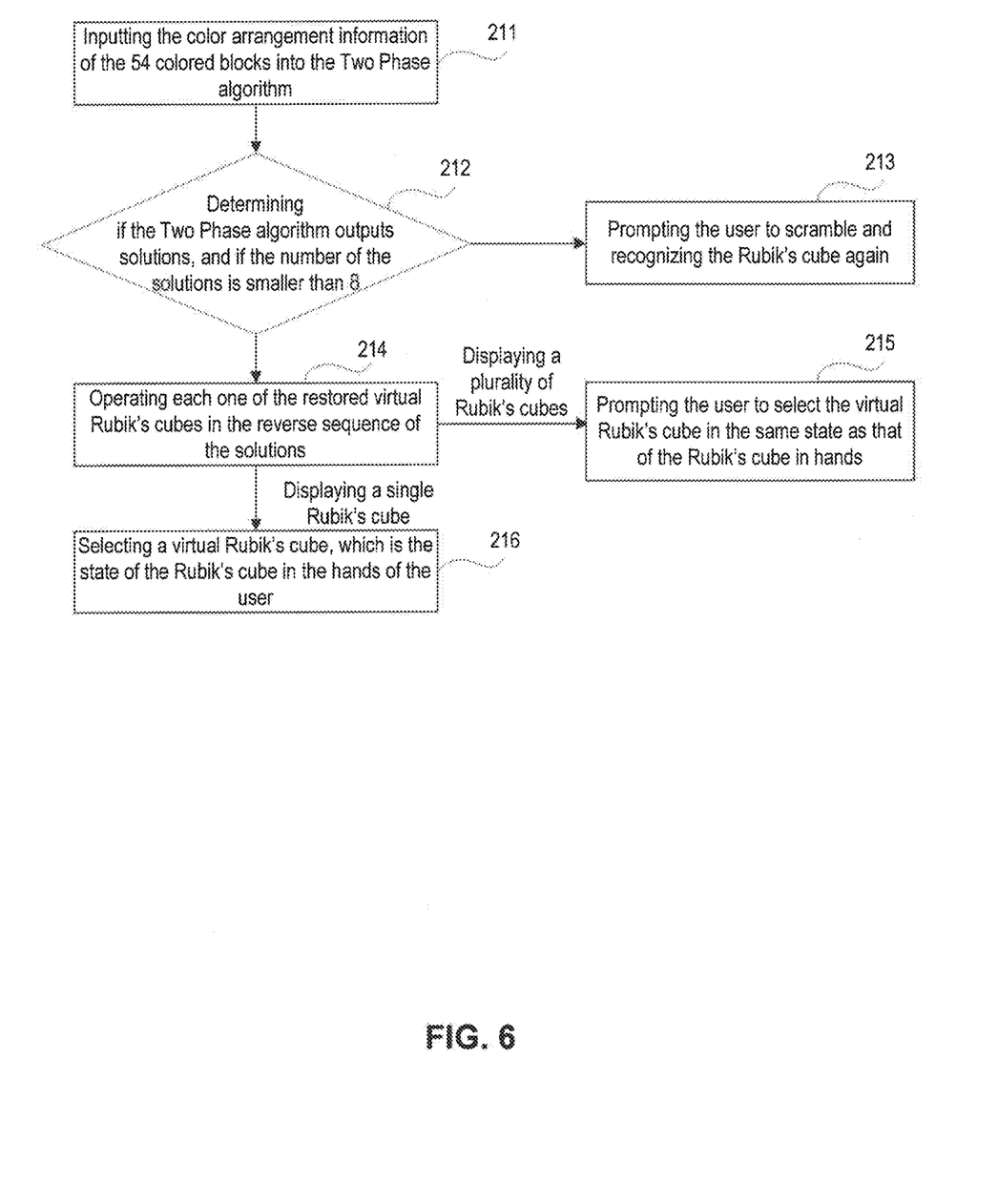
FIG. 6 is a flowchart of a method for restoring the Rubik's cube according to the arrangement information of the colored blocks of the Rubik's cube.

Step 21 of acquiring the restoration solutions of the Rubik's cube, as shown in FIG. 6, can comprise the following steps 211-216.

Step 211, inputting the color arrangement information of the 54 colored blocks into the Two Phase algorithm. The Two Phrase may output thousands of solutions, and it is very troublesome for a user to find out one solution from the thousands of solutions, so the present disclosure adopts the standard of no more than eight solutions.

Step 212, determining if the Two Phase algorithm outputs solutions, and if the number of the solutions is smaller than 8;

if not, executing Step 213 to prompt users to scramble the Rubik's cube and performing recognition again;

if yes, executing Step 214 to operate each of the restored virtual Rubik's cubes by the reverse sequence of the corresponding one of the solutions, wherein the operation result may be the current state of the Rubik's cube of the user or includes a plurality of Rubik's cube states of the Rubik's cube currently in the hands of the user;

if the operation result includes a plurality of Rubik's cube states of the Rubik's cube currently in the hands of the user, executing Step 215 to prompt the user to select a virtual Rubik's cube which is in a state identical with the current state of the Rubik's cube in hands;

if the operation result is the current state of the Rubik's cube of the user, executing Step 216, wherein the selected virtual Rubik's cube shows the state of the Rubik's cube in hands of the user.

In step 22, the restoring steps of the Rubik's cube can be displayed.

Selected virtual Rubik's cube is restored in the forward sequence, and the restoration process is displayed to the user. Then, the user can operate the Rubik's cube in hands according to the restoration process. Finally, the restoration of the Rubik' cube is completed.

Figure 7:
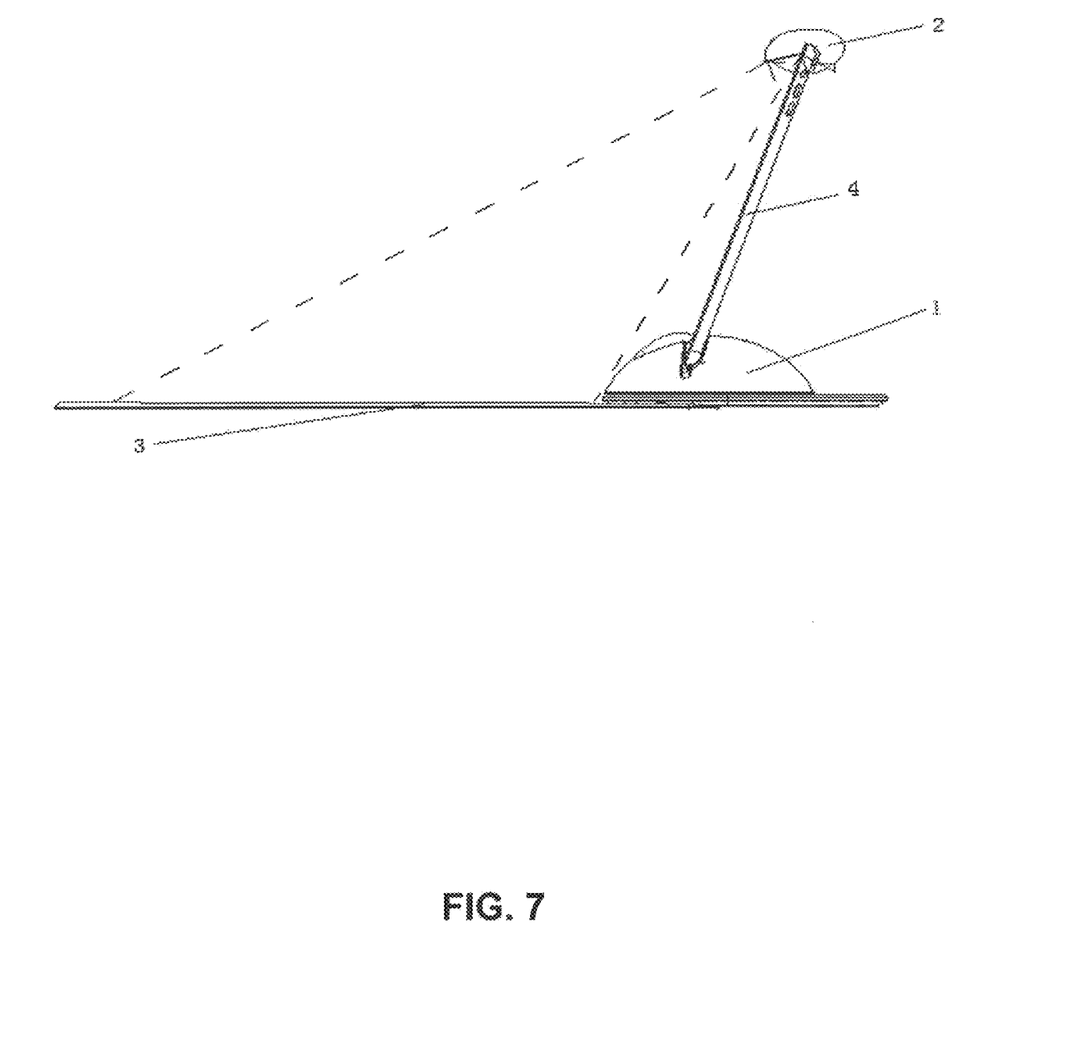
FIG. 7 is an exemplary device for guiding users to restore Rubik's cube.

FIG. 7 is an exemplary device for guiding users to restore Rubik's cube, according to embodiments of the disclosure. The device comprises: an acquisition equipment 2 that acquires the arrangement information of color blocks of a Rubik's cube; a restore equipment 4 that connects with the acquisition equipment and acquires a restoring solution and displays steps for restoring the Rubik's cube according to the arrangement information of the colored blocks of the Rubik's cube.

Restore equipment 4 can include, for example: PAD, smart phone or computer etc.

In an embodiment of the disclosure, acquisition equipment 2 can be a reflector positioned on the top of restore equipment 4. Restore equipment 4 may be positioned and/or supported by a stand 1, and a bottom plate 3 is positioned on the bottom of stand 1 providing a game area and background for the cube, enabling the restoration simple, fast and accurate. The material of bottom plate 3 may be silica gel, which is soft, conducive to the health of children and may reduce the occurrence of scratches and other injuries.

Acquisition equipment 2 may be part of restore equipment 4 in another exemplary device for guiding users to restore Rubik's cube. For example, restore equipment 4 is a mobile phone and acquisition equipment 2 is the camera of it.

From the above detailed description it is seen that the present disclosure displays the virtual Rubik's cube which completely corresponds to the rear Rubik's cube in the aspects of arrangement and color information by scanning and recognition the real Rubik's cube, and outputs the method for restoring the Rubik's cube. It is fast and convenient to input the colors and arrangement information of the Rubik's cube into application programs by means of scanning the Rubik's cube. The restoration methods output for the Rubik's cubes are simple and practical. The output restoration methods are highly targeted at the current state of Rubik's cubes in hands of the users. The restoration fast, helpful for the game.

The basic principle, main characteristics and advantages of the present disclosure are described above. Those skilled in this field shall understand that the present disclosure is not limited by the above embodiments; the embodiments and the description only explain the principle of the present disclosure; based on the concept and scope of the present disclosure, various changes and improvements can be made, which shall all fall within the scope of the present disclosure claimed for protection. The scope of the present disclosure claimed for protection is defined by the Claims and the equivalent substances.

What is claimed is:

1. A method for guiding a user to restore Rubik's cubes, comprising:
   acquiring arrangement information of colored blocks of a Rubik's cube; and
   displaying steps for restoring the Rubik's cube according to the arrangement information of the colored blocks of the Rubik's cube,
   wherein, acquiring the arrangement information of the colored blocks of the Rubik's cube further comprises:
   setting a scanning region of interest (ROI) in a software interface;
   acquiring and adjusting the position of the Rubik's cube such that the Rubik's cube is located at the right position;
   detecting the position of the Rubik's cube in an original image; and
   extracting colors of the Rubik's cube, wherein displaying the steps for restoring the Rubik's cube according to the arrangement information of the colored blocks of the Rubik's cube further comprises:
   acquiring a restoring solution of the Rubik's cube; and
   displaying the steps for restoring the Rubik's cube,
   wherein acquiring the restoring solution of the Rubik's cube comprises:
   inputting the arrangement information of the colored blocks into a two-phase algorithm;
   determining if the two-phase algorithm outputs solutions, and if a number of the solutions is smaller than 8;
   in response to the determination that the two-phase algorithm fails to output solutions or the number of the solutions is not smaller than 8, prompting users to scramble the Rubik's cube and performing recognition again;
   in response to the determination that the two-phase algorithm outputs solutions and the number of the solutions is smaller than 8, operating each of the restored virtual Rubik's cubes by the reverse sequence of the corresponding one of the solutions, wherein the operation result includes the current state of the Rubik's cube of the user or a plurality of Rubik's cube states of the Rubik's cube currently in the hands of the user;
   when the operation result includes the plurality of Rubik's cube states of the Rubik's cube currently in the hands of the user, prompting the user to select a virtual Rubik's cube, which is in a state identical with the current state of the Rubik's cube in hands of the user;
   if the operation result is the current state of the Rubik's cube in the hands of the user, making the selected virtual Rubik's cube show the state of the Rubik's cube in hands of the user.

2. The method for guiding a user to restore Rubik's cubes according to claim 1, wherein detecting the position of the Rubik's cube in the original image comprises:
   graying the ROI;
   extracting colored block outlines using an edge detection algorithm;
   matching shapes; and
   counting circle centers.

3. The method for guiding a user to restore Rubik's cubes according to claim 2, wherein extracting the colors of the Rubik's cube comprises:
   acquiring the original image from an acquisition device;
   extracting color information of the Rubik's cube in the original image;
   performing recognition six times in a certain fixed sequence;
   determining if a total of 54 colored blocks with 9 colored blocks in each color exist;
   in response to the determination that the 54 colored blocks with 9 colored blocks in each color exist, prompting the user to perform recognition again with proper lighting;
   in response to the determination that the 54 colored blocks with 9 colored blocks in each color do not exist, acquiring the color arrangement information of 54 colored blocks.

4. The method for guiding a user to restore Rubik's cubes according to claim 3, wherein graying the ROI comprises:
defining the data of the original image acquired by the acquisition device as the pixel value of a current coordinate position represented by R, G and B;
graying the ROI in the original image to generate a gray image by using an equation below:

$$Gray(x,y)=0.2989 \times R_{xy}+0.5870 \times G_{xy}+0.1140 \times B_{xy}$$

wherein, Gray (x,y) represents the gray image.

5. The method for guiding a user to restore Rubik's cubes according to claim 4, wherein extracting the colored block outlines using the edge detection algorithm comprises:
determining a change degree of gray values of the gray image based on a gradient between adjacent pixels of the gray image, wherein the gradient is a two-dimensional equivalent expression of a first-order two-dimensional derivative and determined as below:
calculating the difference between adjacent pixels by using the following equations:

$$Gx=f[i,j+1]-f[i,j]$$

$$Gy=f[i,j]-f[i+1,j]$$

wherein, Gx represents the difference of adjacent pixels in the direction x, Gy represents the difference of the adjacent pixels in the direction y, f[i, j+1] represents the pixel value at a position of [i, j+1] in the gray image, f[i, j] represents the pixel value at a position of [i, j] in the gray image; f[i+1, j] represents the pixel value at a position of [i+1, j] in the gray image;
calculating the gradient between adjacent pixels by using the following equation:

$$G(x,y) = \begin{bmatrix} G_x \\ G_y \end{bmatrix} = \begin{bmatrix} \frac{\partial f}{\partial x} \\ \frac{\partial f}{\partial y} \end{bmatrix};$$

wherein, G(x,y) represents the gradient value at a point (x,y) in an image, $$\frac{\partial f}{\partial x}$$

represents the deviation of the pixel value in the direction x, $$\frac{\partial f}{\partial y}$$

represents the deviation of the pixel value in the direction y;
calculating gradient amplitudes of edge points, wherein a collection of the gradient amplitudes of all edge points forms an edge outline, wherein
for the Rubik's cube to be detected, after conversion into the gray image,
edge outlines of blocks of the original image are extracted using an edge detection method.

6. The method for guiding a user to restore Rubik's cubes according to claim 5, wherein the edge detection algorithm is selected from Sobeloperator, Robertsoperator, Prewittoperator, and Cannyoperator.

7. The method for guiding a user to restore Rubik's cubes according to claim 5, wherein matching the shapes comprises:
for the extracted edge outlines, screening binary outlines by using a shape matching method;
calculating distances between the outlines of shapes of the blocks; and
determining, among the blocks, whether a shape of a block of the Rubik's cube is an oval shape based on the distances, wherein the distances are calculated by using the following formula:

$$C_s = \frac{1}{2} \sum_{k=1}^{K} \frac{[g(k)-h(k)]^2}{g(k)+h(k)}$$

$$\text{Outline shape of colored block} = \begin{cases} \text{Oval} & C_s < M \\ \text{Non-oval} & C_s \geq M \end{cases}$$

wherein, $C_s$ represents the distance value between the outline of a standard oval shape and the shape of a colored block of the Rubik's cube; g(k) and h(k) respectively represent an outline point set of the standard oval shape and a shape to be detected; M represents a threshold distance value; k represents the kth element point in the outline point set; K represents the number of the elements in the outline point set; when Cs is smaller than M, it is determined that the outline shape of the current colored block is oval; and when Cs is greater than or equal to M, it is determined that the outline shape of the current colored block is not oval.

8. The method for guiding a user to restore Rubik's cubes according to claim 7, wherein counting circle centers comprises:
determining a number of the outlines in the oval shape;
determining whether the number of the outlines in the oval shape is greater than 18;
in response to the determination that the number of outlines in the oval shape is greater than 18, determining that the Rubik's cube is correctly placed in a game scanning area, or
in response to the determination that the number of outlines in the oval shape is less than or equal to 18, promoting the user to adjust the position of the Rubik's cube for re-testing.

9. The method for guiding a user to restore Rubik's cubes according to claim 3, wherein acquiring the original image from the acquisition device further comprises:
acquiring images for each of six surfaces of the Rubik's cube.

10. The method for guiding a user to restore Rubik's cubes according to claim 9, wherein acquiring the images for each of six surfaces of the Rubik's cube further comprises:
among the six surfaces, acquiring the images of two surfaces of the Rubik's cube at a same time;
rotating the Rubik's cube to acquire the images of another two surfaces of the Rubik's cube; and
generating the images of the other two surfaces based on the acquired four images of the four surfaces.

11. The method for guiding a user to restore Rubik's cubes according to claim 9, wherein acquiring the images for each of six surfaces of the Rubik's cube further comprises:
among the six surfaces, acquiring the images of three surfaces of the Rubik's cube at a same time; and
rotating the Rubik's cube to acquire the images of the other three surfaces of the Rubik's cube.

12. A device for guiding a user to restore Rubik's cube:
a memory storing a set of instructions; and
one or more processors configured to execute the set of instructions to cause the device to perform:
acquiring arrangement information of colored blocks of a Rubik's cube; and
displaying steps for restoring the Rubik's cube according to the arrangement information of the colored blocks of the Rubik's cube,
wherein, in acquiring the arrangement information of the colored blocks of the Rubik's cube, the one or more processors are configured to execute the set of instructions to further cause the device to perform:
setting a scanning region of interest (ROI) in a software interface;
acquiring and adjusting the position of the Rubik's cube such that the Rubik's cube is located at the right position;
detecting the position of the Rubik's cube in an image; and
extracting colors of the Rubik's cube,
wherein in displaying the steps for restoring the Rubik's cube according to the arrangement information of the colored blocks of the Rubik's cube, the one or more processors are configured to execute the set of instructions to further cause the device to perform:
acquiring a restoring solution of the Rubik's cube; and
displaying the steps for restoring the Rubik's cube,
wherein in acquiring the restoring solution of the Rubik's cube, the one or more processors are configured to execute the set of instructions to further cause the device to perform:
inputting the arrangement information of the colored blocks into a two-phase algorithm;
determining if the two-phase algorithm outputs solutions, and if a number of the solutions is smaller than 8;
in response to the determination that the two-phase algorithm fails to output solutions or the number of the solutions is not smaller than 8, prompting users to scramble the Rubik's cube and performing recognition again;
in response to the determination that the two phase algorithm outputs solutions and the number of the solutions is smaller than 8, operating each of the restored virtual Rubik's cubes by the reverse sequence of the corresponding one of the solutions, wherein the operation result includes the current state of the Rubik's cube of the user or a plurality of Rubik's cube states of the Rubik's cube currently in the hands of the user;
when the operation result includes the plurality of Rubik's cube states of the Rubik's cube currently in the hands of the user, prompting the user to select a virtual Rubik's cube, which is in a state identical with the current state of the Rubik's cube in hands of the user;
if the operation result is the current state of the Rubik's cube in the hands of the user, making the selected virtual Rubik's cube show the state of the Rubik's cube in hands of the user.

13. The device of claim 12, wherein the device is one of: a PAD, a smart phone, or a computer.

14. The device of claim 12, further comprising:
a stand for holding a main body of the device on a first side; and
a bottom plate, positioned on a second side of the stand that is opposite to the first side.

* * * * *